(12) United States Patent
Brandstötter et al.

(10) Patent No.: US 12,529,502 B2
(45) Date of Patent: Jan. 20, 2026

(54) SYSTEM AND METHOD FOR CONTROLLING A HEAT PUMP

(71) Applicant: Fronius International GmbH, Pettenbach (AT)

(72) Inventors: Markus Brandstötter, Pettenbach (AT); Johannes Mühlegger, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 383 days.

(21) Appl. No.: 18/042,384

(22) PCT Filed: Aug. 26, 2021

(86) PCT No.: PCT/EP2021/073591
§ 371 (c)(1),
(2) Date: Feb. 21, 2023

(87) PCT Pub. No.: WO2022/043426
PCT Pub. Date: Mar. 3, 2022

(65) Prior Publication Data
US 2023/0324095 A1  Oct. 12, 2023

(30) Foreign Application Priority Data
Aug. 27, 2020 (EP) .................................... 20193167

(51) Int. Cl.
*F25B 49/00* (2006.01)
*F25B 30/06* (2006.01)
(Continued)

(52) U.S. Cl.
CPC .............. *F25B 49/00* (2013.01); *F25B 30/06* (2013.01); *H05K 7/20945* (2013.01); *B60L 53/302* (2019.02)

(58) Field of Classification Search
CPC ..... F25B 49/00; F25B 30/06; H05K 7/20945; B60L 53/302; F24H 2240/09;
(Continued)

(56) References Cited

U.S. PATENT DOCUMENTS

2008/0294667 A1* 11/2008 Kopf ................... H04L 67/56
2011/0030753 A1*  2/2011 Weaver ............... F24D 11/001
                                                        136/201
(Continued)

FOREIGN PATENT DOCUMENTS

DE   10 2008 019 053 A1   10/2009
DE   10 2017 203 249 A1    8/2018
(Continued)

OTHER PUBLICATIONS

Fischer, David, and Hatef Madani. "On heat pumps in smart grids: A review." Renewable and Sustainable Energy Reviews 70 (2017): 342-357 (Year: 2017).*

(Continued)

Primary Examiner — Christopher E. Everett
(74) Attorney, Agent, or Firm — Maginot, Moore & Beck LLP

(57) ABSTRACT

Energy system (1) comprising an inverter (3) for converting an electrical direct voltage into an alternating voltage which can be used to supply electrical consumption units (4) of the energy system (1) and can be converted into heat by means of at least one heat pump (7) of the energy system (1), characterised in that in that the heat pump (7) can be controlled by means of a system control (10) of the energy system (1) via a control interface (12) in accordance with a heat pump configuration file (WPK) loaded specifically for the at least one heat pump (7) in a data memory (11) of the system control (10), wherein a communication of the system control (10) with a heat pump control (8) provided for the (Continued)

heat pump (7) is effected in accordance with at least one control type of the heat pump (7) indicated in the heat pump configuration file (WPK).

15 Claims, 8 Drawing Sheets

(51) Int. Cl.
*H05K 7/20* (2006.01)
*B60L 53/302* (2019.01)

(58) Field of Classification Search
CPC . Y02B 70/3225; Y04S 20/222; Y04S 20/244; F24D 19/1072; H04L 12/403
See application file for complete search history.

(56) References Cited

U.S. PATENT DOCUMENTS

| | | | | |
|---|---|---|---|---|
| 2012/0232706 | A1* | 9/2012 | Hayashida | H02J 3/003 700/282 |
| 2012/0235478 | A1* | 9/2012 | Hayashida | F24D 17/02 307/11 |
| 2017/0005477 | A1 | 1/2017 | Sanders et al. | |
| 2017/0227299 | A1* | 8/2017 | Eustis | F25B 30/02 |
| 2019/0324411 | A1* | 10/2019 | Vanhoudt | G05B 15/02 |
| 2020/0014210 | A1* | 1/2020 | Arnold | H02J 3/381 |

FOREIGN PATENT DOCUMENTS

| | | |
|---|---|---|
| DE | 10 2017 220 414 A1 | 5/2019 |
| EP | 1 978 715 A1 | 10/2008 |
| WO | 2013144310 A2 | 10/2013 |
| WO | 2017007691 A1 | 1/2017 |

OTHER PUBLICATIONS

Fischer, David, Marc-AndréTriebel, and Oliver Selinger-Lutz. "A concept for controlling heat pump pools using the smart grid ready interface." 2018 ieee pes innovative smart grid technologies conference europe (isgt-europe). IEEE, 2018 (Year: 2018).*
International Search Report corresponding to PCT Application No. PCT/EP2021/073591, mailed Dec. 9, 2021 (German and English language document) (5 pages).
Brochure, "Added value through technology functions—photovoltaic plant integration", undated.
Modbus Communication Driver, web page excerpt, https://www.reliance-scada-com/en/products/reliance4/communication-drivers/modbus-communication-driver, dated Jan. 23, 2023.

* cited by examiner

|  | Parameter | Value | Unit |
|---|---|---|---|
| CONTROL PARAMETERS | ControlSetPower (I) | available | |
| | ControlSetTemperature (II) | n.a. | |
| | ControlSetSGStatus (III) | available | |
| | ControlReadSurplusPower (IV) | n.a. | |
| | SetPowerMax (I) | 4000 | W |
| | SetPowerMin (I) | 1000 | W |
| | SetTemperatureMax (I, II, III) | 70 | C |
| | SGMIN (III) | n.a. | |
| | SGNORMAL (III) | available | |
| | SGFORCED (III) | available | |
| | SGMAX (III) | n.a. | |
| | SGNORMAL (III) | | |
| | - SGPin1 | 1 | |
| | - SGPin2 | 0 | |
| | SGFORCED (III) | | |
| | - SGPin1 | 0 | |
| | - SGPin2 | 1 | |
| MODBUS PARAMETERS | ModbusTCP | available | |
| | - TCPPort | 502 | |
| | - TCPOffset | 0 | |
| | - TCPSlaveAddress | 1 | |
| | - TCPByteEndian | big | |
| | - TCPWordEndian | big | |
| | ModbusRTU | available | |
| | - RTUOffset | 0 | |
| | - RTUSlaveAddress | 1 | |
| | - RTUBaudRate | 9600 | |
| | - RTUParity | none | |
| | - RTUStopBit | 1 | |
| | - RTUByteEndian | big | |
| | - RTUWordEndian | big | |

FIG. 4A

| | Register | Value | Unit | Scaling Factor | Register Address | Data Type | Register Type |
|---|---|---|---|---|---|---|---|
| Data Point Information | HeatPumpState | available | | 1 | 703 | int16 | Holding Register (RW) |
| | SetPowerReg | available | W | 1 | 1000 | int16 | Discrete Inputs (R) |
| | TempWWSO | available | C | 0.1 | 401 | int16 | Coil (RW) |
| | SetTempWS | n.a. | | | | | |
| | SGActivate | n.a. | | | | | |
| | SGPin1 | available | | 1 | 705 | int16 | Discrete Inputs (R) |
| | SGPin2 | available | | 1 | 706 | int16 | Input Register (R) |
| | SGStatus | n.a. | | | | | |
| | TempAmbientAir | available | C | 0.1 | 1502 | int16 | Holding Register (RW) |
| | CumEnergyHeat | available | kWh | 1 | 701 | int16 | Holding Register (RW) |
| | CumEnergyEl | available | kWh | 1 | 702 | int16 | Holding Register (RW) |
| | EnergyMeterEl | n.a. | | | | | |

FIG. 4B

|  | Parameter | Value | Unit |
|---|---|---|---|
| Control Strategy | ControlType | ControlSetPower (I) |  |
| Further Control Parameters | ThresholdPurchase | 500 | W |
|  | WriteInterval | 120 | s |
|  | AverageInterval | 120 | s |
|  | *SGThresholdForced* | *1000* | *W* |
| Further Modbus Parameters | HeatpumpIP | 192.168.0.1 |  |
|  | ModbusType | ModbusTCP |  |
| Modbus Parameters (default values stem from Config File) | TCPPort | 502 |  |
|  | TCPOffset | 0 |  |
|  | TCPSlaveAddress | 1 |  |
|  | TCPByteEndian | big |  |
|  | TCPWordEndian | big |  |

FIG. 5

SYSTEM AND METHOD FOR CONTROLLING A HEAT PUMP

BACKGROUND

The invention relates to a system, in particular an energy management system of an energy system, and to a method for controlling a heat pump which is incorporated into the energy management system of the energy system.

Energy systems, in particular photovoltaic systems, can be combined with heat pumps. A photovoltaic system provides solar electricity which the heat pump of the energy system can convert into heat. This converted heat can be stored in a hot water or buffer storage device of the energy system. The temperatures of the storage medium can be increased over the course of the day during solar electricity production. In the evening hours, the demand for heating and hot water can be covered initially from the hot water and buffer storage device. During operation, a heat pump extracts heat from the environment, i.e. air, earth or groundwater, and supplies it to the local energy system. By combining a heat pump with a photovoltaic system, the locally produced photovoltaic current can be used for the heat pump. The photovoltaic system provides solar electricity for the heat pump, and so in particular the heating costs can be lowered. Furthermore, the heat pump increases the efficiency of the photovoltaic system by reason of the increased reduction in the locally produced photovoltaic current. The heat pump can have an evaporation unit, a compression unit, a condenser unit and an expansion unit and can be operated in a cycle process. The photovoltaic system comprises a plurality of solar modules and one or a plurality of inverters which convert the electrical direct current generated by the solar modules into an alternating voltage. This generated alternating voltage can be used for operating at least one heat pump. However, conventional heat pumps can be activated in a different manner and thus have different control types. Therefore, in the case of conventional energy systems it is extremely difficult to integrate or incorporate heat pumps from different manufacturers and/or of a different control type into the energy system or the energy management system. Furthermore, it is almost impossible to replace an implemented heat pump having a specific control type and/or from a specific manufacturer with a different type of heat pump from another manufacturer and/or of another control type.

In many cases, an energy management system is to be introduced into an existing energy system which already has a heat pump present therein. An energy management system can be formed e.g. with a modern photovoltaic inverter which has a system control with the required capabilities for energy management. Complete incorporation of the heat pump into the energy management system often founders on the issue of compatibility with the heat pump already present. Although in some cases simple switching on/off of the heat pump can be performed by an energy management system, this is no way to achieve efficient energy management and the hard switching on and off can put unnecessary stress on the components of the heat pump and thus shorten the service life thereof.

The prior art discloses energy management systems which likewise activate heat pumps in dependence upon the availability of an energy source. The implementation differs in terms of the type of integration of the heat pump. In this case, a specific control type of a heat pump is natively integrated into the source code of the energy management, but not via a heat pump configuration file. This has the disadvantage that the source code must be adapted for the implementation of another heat pump. The outlay for this is considerable and is generally not possible for the operator. As a result, there is limited compatibility with heat pumps.

Furthermore, the prior art discloses an energy management system for buildings, which can read out and write registers via various protocols, such as e.g. MODBUS. The user has the option of configuring the registers via a tool. With the option of reading-out and writing registers of the heat pump, the targeted use of energy sources, such as e.g. increasing own consumption, is not achieved.

SUMMARY OF THE DISCLOSURE

Therefore, it is an object of the present invention to provide an energy system which allows different heat pumps, in particular heat pumps of a different control type, to be flexibly incorporated into the energy system and its energy management, so as to facilitate a replacement or upgrade of a heat pump within the energy system.

A further object of the present invention resides in the fact that an energy system comprising at least one heat pump can be extended with an inverter comprising an energy management system, wherein the connection of heat pumps of different control types to the inverter or its energy management system is rendered possible in a simple manner.

In accordance with the invention, this object is achieved by an energy system having the features stated in claim 1.

Accordingly, the invention provides an energy system comprising an inverter for converting an electrical direct voltage into an alternating voltage which can be used for supplying electrical consumption units of the energy system and can be converted into heat by means of at least one heat pump of the energy system, wherein the heat pump can be controlled by means of a system control of the energy system via a control interface in accordance with a heat pump configuration file loaded in a data memory of the system control, wherein a communication with a heat pump control provided for the heat pump is effected in accordance with a control type of the heat pump indicated in the heat pump configuration file, wherein the heat pump supports a plurality of control types from a specified group of control types, wherein the group of control types comprises the following control types:

a first control type (I), in which the heat pump can be controlled by set power, a second control type (II), in which the heat pump can be controlled by set temperature, a third control type (III), in which the heat pump can be controlled by an SG-Ready specification, and a fourth control type (IV), in which the heat pump can be controlled by simulation or emulation of a heat pump electricity meter.

In addition to the configuration of the registers, the heat pump configuration file describes possible variants of the activation of the heat pump, and so a customer does not need a person skilled in the art to configure the registers and program the heat pump control.

In one possible embodiment, the energy system comprises a photovoltaic system having solar modules which generate a direct voltage which is converted into an alternating voltage by means of the inverter.

In a further possible embodiment of the energy system in accordance with the invention, the control type of the heat pump comprises one of four specified control types.

In the case of a first control type, the heat pump can be controlled by set power.

In the case of a further control type, the heat pump can be controlled by set temperature.

In the case of a third control type, the heat pump can be controlled by an SG-Ready specification.

In the case of a fourth control type, the heat pump can be controlled by a heat pump electricity measuring unit of the energy system, which is simulated or emulated by the system control.

In one possible embodiment of the energy system in accordance with the invention, at least one parameter indicated in the heat pump configuration file indicates a communication protocol for communication of the system control with the heat pump control.

In a possible embodiment of the energy system in accordance with the invention, the communication protocol indicated in the heat pump configuration file has a MODBUS communication protocol, in particular a MODBUS-TCP communication protocol or a MODBUS-RTU communication protocol.

In a further possible embodiment of the energy system in accordance with the invention, the system control of the energy management system communicates with the heat pump control via the control interface and a bus of the energy system in accordance with the communication protocol indicated in the heat pump configuration file. The communication is effected preferably bidirectionally.

In a further possible embodiment of the energy system in accordance with the invention, the system control of the energy system is automatically configured as a master device or as a slave device in dependence upon the control type indicated in the heat pump configuration file.

In a further possible embodiment of the energy system in accordance with the invention, the heat pump configuration file of the heat pump includes a network address of the heat pump control for communication with the system control of the energy system in accordance with the data point information indicated in the heat pump configuration file of the heat pump.

In one possible embodiment of the energy system in accordance with the invention, the heat pump configuration file of the heat pump has a JSON, XML, CSV or TXT file.

In a further possible embodiment of the energy system in accordance with the invention, the system control is integrated in the inverter of the energy system.

In a further possible embodiment of the energy system in accordance with the invention, the energy system is connected to an electricity supply network via an electricity measuring unit, which supplies measurement data to the system control or the energy management system of the energy system.

In a further possible embodiment of the energy system in accordance with the invention, the heat pump configuration file includes configurable operating parameters for parameterising the control type and/or the heat pump.

In a further possible embodiment of the energy system in accordance with the invention, the heat pump configuration file can be selected and edited via a user interface of the system control or of the energy management system.

In a further possible embodiment of the energy system in accordance with the invention, the heat pump configuration file is loaded from a web server of a cloud platform via a data network into the local data memory of the system control of the energy system.

In a further possible embodiment of the energy system in accordance with the invention, the heat pump configuration file is loaded by a reading unit of the system control from a data carrier into the local data memory of the system control of the energy system.

In a further possible embodiment of the energy system in accordance with the invention, the inverter receives the electrical direct voltage from a photovoltaic module and converts it into an alternating voltage.

In a further possible embodiment of the energy system in accordance with the invention, the heat pump control has a local data memory for storing one or more associated heat pump configuration files which can be read out by the system control of the energy system via the bus of the energy system during an initialisation procedure of the energy system and can be stored in the data memory of the system control.

In a further possible embodiment of the energy system in accordance with the invention, the heat pump control of the heat pump is integrated in the heat pump.

In the case of an alternative embodiment, the heat pump control of the heat pump is connected to the heat pump outside the heat pump and via an interface.

According to a further aspect, the invention provides a method for controlling a heat pump.

Possible embodiments of the energy system in accordance with the invention and the method for controlling a heat pump in accordance with the invention will be explained in greater detail hereinafter with reference to the enclosed figures.

BRIEF DESCRIPTION OF THE DRAWINGS

In the drawing:

FIGS. 4A, 4B show in table form an exemplified embodiment of a heat pump configuration file;

FIG. 5 shows by way of example possible settings and inputs via the user interface based upon the heat pump configuration file of FIGS. 4A, 4B;

DETAILED DESCRIPTION

Figure 1:
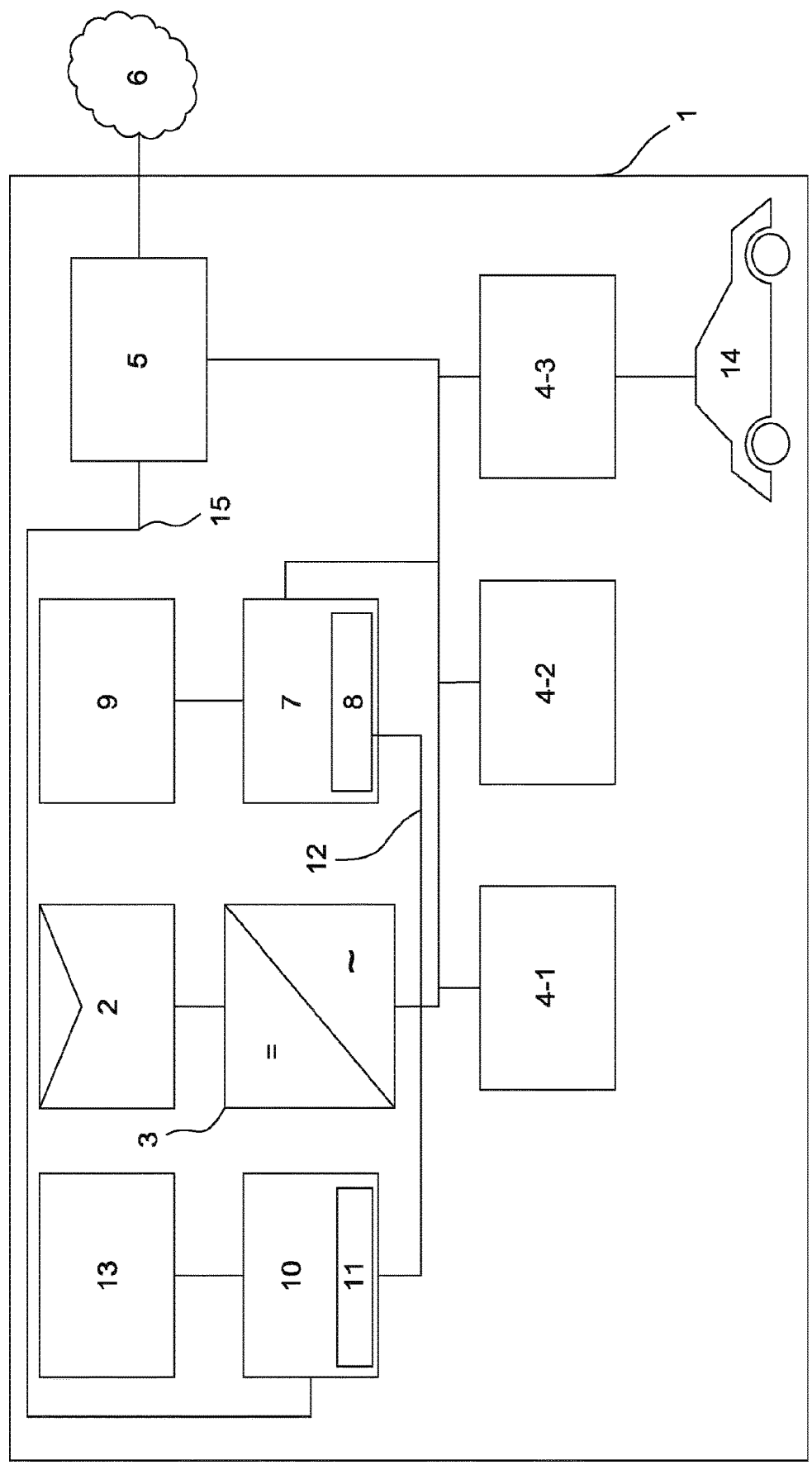
FIG. 1 shows a block circuit diagram to illustrate an exemplified embodiment of an energy system in accordance with the invention.

As can be seen in FIG. 1, an energy system 1 comprises a plurality of main components. In the case of the exemplified embodiment illustrated in FIG. 1, the energy system 1 comprises a photovoltaic system having photovoltaic modules 2 which provide a photovoltaic current. An inverter 3 of the energy system 1 converts a received electrical direct voltage or direct current into an alternating voltage. This alternating voltage can be used for supplying electrical consumption units 4 (4-1, 4-2, 4-3) of the energy system 1. The electrical consumption units 4 can be different units which consume electrical energy. The electrical consumption units 4 are e.g. domestic appliances or electric pumps. Furthermore, the electrical consumption unit 4-3 illustrated in FIG. 1 is suitable for connecting electrical storage units, in particular batteries, to the energy system 1. For example, a vehicle battery of a vehicle 14 can be connected via the unit 4-3 (wall box) of the energy system 1 for charging purposes. Furthermore, the energy system 1 has an electricity measuring unit 5. An electricity supply network 6 is connected to the energy system 1 via the electricity measuring unit 5. The electricity measuring unit 5 is connected to the system control 10 via a data line 15. The energy system 1 can feed electrical current into the electricity supply network 6 or draw it from the electricity supply network 6 via the electricity measuring unit 5. The energy system 1 has at least one heat pump 7 with an associated heat pump control 8. In one possible embodiment, the heat pump control 8 can be integrated in the heat pump 7, as illustrated in FIG. 1. Alternatively, an external heat pump control 8 can be connected (not illustrated) to the heat pump 7 via an interface. The heat pump 7 is preferably connected to a heat storage device 9 which intermediately stores the heat generated by the heat pump 7. The heat storage device 9 can be formed by a buffer storage device (water tank), a floor heating arrangement, the water content of a pool or the like. Likewise, the heat storage device 9 can be formed by a cold storage device. The heat pump 7 can also be connected (not illustrated) to a cooling device.

The energy system 1 has a system control 10 having a data memory 11. In one possible embodiment, the data memory 11 can be integrated in the system control 10, as illustrated in FIG. 1. Alternatively, the data memory 11 is connected to the system control 10 via a data interface or a local data network. As illustrated in FIG. 1, the system control 10 having the integrated data memory 11 is connected to the heat pump control 8 of the heat pump 7 via a control interface 12. The heat pump 7 can be controlled by the system control 10 of the energy system 1 via the control interface 12 in accordance with a heat pump configuration file which is stored or loaded in the data memory 11 of the system control 10. A communication is effected with the heat pump control 8, which is provided for the heat pump 7, according to a control type of the heat pump 7 indicated in the heat pump configuration file.

A heat pump configuration file WPK (as illustrated by way of example in FIGS. 4A, 4B) forms preferably subsequently a selection of parameters for further user inputs (as illustrated by way of example in FIG. 5). For example, a user can input or select a MODBUS type, MODBUS parameters, further connection parameters, a control strategy and further control parameters via a user interface 13 of the system control 10 or of the energy management system, if several options are available for selection according to the heat pump configuration file. The user interface 13 is preferably an application, such as a website or an app, which can be launched or called up from e.g. a fixedly connected device or a portable device, such as a tablet or mobile phone. The user or operator of the energy system 1 can perform specific settings via the user interface 13.

The data memory 11 of the energy system 1 is used for local data storage of the heat pump configuration file WPK of the heat pump 7. In one possible embodiment, the heat pump configuration file WPK is loaded from a web server of a cloud platform via a data network into the local data memory 11 of the system control 10 of the energy system 1. Alternatively, the heat pump configuration file WPK can also be loaded by means of a reading unit of the system control 10 from a data carrier into the local data memory 11 of the system control 10 of the energy system 1. In one possible embodiment, the heat pump configuration file WPK of the heat pump 7 can have a JSON, XML, CSV or TXT file. In one possible embodiment, at least one parameter indicated in the heat pump configuration file indicates a communication protocol for communication of the system control 10 with the heat pump control 8. In one possible embodiment, the communication protocol indicated in the heat pump configuration file WPK has a MODBUS communication protocol. This can be a MODBUS-TCP communication protocol or a MODBUS-RTU communication protocol. In one possible embodiment, the control interface 12 between the system control 10 of the energy system 1 and the heat pump control 8 of the heat pump 7 has a bus for transmitting control signals and/or data. In one possible embodiment of the energy system 1 in accordance with the invention, the communication between the system control 10 and the heat pump control 8 is bidirectional, i.e. by exchanging data and control signals in both directions. In one embodiment, the communication can also be effected via a radio interface between the heat pump control 8 and the system control 10. In one possible embodiment, the system control 10 of the energy system 1 is automatically configured as a master device or as a slave device in dependence upon the control type indicated in the heat pump configuration file WPK. In one possible embodiment, the heat pump configuration file WPK of the heat pump 7 includes a network address of the heat pump control 8 for communication with the system control 10 of the energy system 1 according to the data point information indicated in the heat pump configuration file WPK of the heat pump 7. The heat pump configuration file WPK includes preferably configurable operating parameters for parameterising the control type of the heat pump and/or of the heat pump 7 itself.

FIGS. 4A, 4B show in table form an exemplified embodiment of a heat pump configuration file WPK. In the case of the exemplified embodiment of the heat pump configuration file WPK illustrated in FIGS. 4A, 4B, this comprises control parameters, MODBUS parameters and data point information.

In the example illustrated in FIG. 4A, control by set power is entered as a possibility as control type I (ControlSetPower available) and control by SG-Ready specification is entered as a possibility as control type III (ControlSetSGStatus available). The remaining two control types II and IV are not supported by the relevant heat pump control 8 and therefore cannot subsequently be available for selection or application. In order to ensure this, ControlSetTemperature and ControlReadSurplusPower are set to unavailable ("n.a.") in FIG. 4A.

In the case of control by set power according to control type I, e.g. a value of a current or an instantaneously available proportion of a surplus power of an energy system 1 or an electricity supply network 6 is written to a register of the heat pump control 8. In the example in FIG. 4B, this corresponds to the register "SetPowerReg" with the register address 1000 and the value of an excess power is adopted by the heat pump control 8 in the unit Watt as a 16-bit integer "int16". In the case that both the energy management system and the heat pump control use the same unit for a value, e.g. Watt "W", the scaling factor=1 is entered in the heat pump configuration file in FIG. 4B. By means of the scaling factors for the registers of heat pump controls, different units of values can be easily harmonised between any heat pump controls 8 and the energy management system of the energy system 1. Excess power in an energy system 1 often arises as a result of the inverter 3 generating power which exceeds consumption. In order to increase the efficiency of a PV system, an attempt is generally made to use as high a proportion of the generated energy as possible in the energy system 1 itself, instead of feeding the generated energy into the electricity supply network. Depending upon the temperature of the heat storage device 9, the heat pump control 8 can decide whether and to what extent the communicated excess power is used.

In the case of the second control type II by set temperature, a desired set-point temperature is written to a set-point temperature register of the heat pump control 8 in correlation with the instantaneous excess power. The set-point temperature relates e.g. to a warm water or hot water storage device 9. In the example in FIG. 4B, this corresponds to the register "SetTempWS". Since, in the example, the heat pump 7 according to FIG. 4A does not support control type II, the register is not available ("n.a.") and consequently no register address is entered.

In the case of the third control type III, the heat pump control 8 is effected by an SG-Ready specification. In correlation with the current surplus power, a switch is made to the corresponding SG-Ready operating states by means of an SG-Ready specification. In the example according to FIG. 4B, the SG-Ready specification is effected via the registers "SGPin1" and "SGPin2" with the register addresses 705 and 706. The logical values to be output on "SGPin1" and "SGPin2" for the respective SG-Ready specification operating state are entered e.g. in the heat pump configuration file WPK in FIG. 4A under "SGNORMAL" and "SGFORCED". For "SGNORMAL" and "SGFORCED" a value can be entered e.g. even additionally.

The fourth control type IV can be applied in the case of heat pump controls 8 which, according to the prior art, interrogate a surplus power from a heat pump smart meter specifically adapted to the respective heat pump control 8.

In the case of the fourth control type IV, the heat pump control 8 interrogates the current surplus power from the system control 10. The system control 10 simulates a heat pump smart meter for the heat pump control 8. In this case, the heat pump control 8 is the MODBUS master. The system control 10 configured as the MODBUS slave takes the place of a heat pump smart meter typically configured as a MODBUS slave and thus replaces the heat pump smart meter.

Since the system control 10 is connected to the electricity measuring unit 5 via the data line 15, the latter can relay the measured values of the electricity measuring unit 5 to the heat pump control 8 by simulating a heat pump smart meter. In a particularly advantageous embodiment, the energy management system decides whether a current measured value of the electricity measuring unit 5, or another advantageous value determined by the energy management system, is provided by the system control 10 by means of simulation of a heat pump smart meter for the heat pump control 8. In the example according to FIG. 4A, control type IV "ControlReadSurplusPower" is not available ("n.a."). Consequently, in FIG. 4B, the register for a value of the surplus power "EnergyMeterE1" is likewise not available.

In a further particularly advantageous embodiment, the system control 10 is integrated into an inverter 3 or the system control 10 is functionally implemented by an inverter 3.

As illustrated in FIG. 4A, the heat pump configuration file WPK includes further control parameters, in particular a maximum set-point power ("SetPowerMax"), a minimum set-point power ("SetPowerMin") or a maximum set-point temperature of the heat storage device 9 ("SetTemperatureMax"). The control parameters can also include various SG-Ready specifications for the third control type III, as illustrated in FIG. 4A.

In addition to the control parameters, the heat pump configuration file WPK includes various MODBUS parameters, as shown in FIG. 4A. In the example illustrated in FIG. 4A, the communication protocols MODBUS-TCP and MODBUS-RTU are entered as available ("Modbus-TCP available" and "Modbus-RTU available"). In FIG. 4A, further typical parameters with adapted values between a system control 10 and the heat pump control 8 to be connected, such as "TCPPort" or "RTUBaudRate", are indicated with respect to MODBUS-TCP and MODBUS-RTU.

In addition to the control parameters and the MODBUS parameters, the heat pump configuration file WPK includes data point information in the example illustrated in FIG. 4B, in continuation of FIG. 4A. Data point information specifies registers for the communication. In the case of a specific heat pump type, these registers can either be available ("available") or not available ("n.a."). In the case of some registers, units are allocated to the values, e.g. the value indicated in the register "SetPowerReg" is a Watt value (W). The units are optional. If a register is "available", the following details are required: Scaling factor, register address, data type, register type. For instance, a scaling factor is indicated for each value of a register, and a register address is indicated for various registers in the heat pump configuration file WPK—as illustrated in FIGS. 4A, 4B. Likewise, a data type of the relevant register as well as a register type are indicated. Some registers can both be read and also written ("RW": Read/Write). Other registers can merely be read out ("R": Read).

In accordance with the invention, heat pump configuration files WPK can be defined for each heat pump brand or each heat pump type. These can differ from each other in terms of content depending upon the type and model of the heat pump 7. However, the structure of the heat pump configuration file WPK remains the same, and so the system control 10 of the energy system 1 or an energy management system can gain access thereto. In this way, the programming of the energy management system or the system control 10 can be carried out in a uniform and simple manner because the necessary adaptations to parameters and control types for the control of various heat pumps 7 are effected by means of the integration of a corresponding heat pump configuration file WPK. The energy management system determines e.g. the currently most favourable energy consumption and provides, via the system control 10, e.g. a corresponding recommendation in a form compatible for the heat pump control 8 of the heat pump 7.

In one possible embodiment, the heat pump configuration files WPK consist substantially of three parts, namely control parameters, MODBUS parameters and data point information, as illustrated by way of example in FIGS. 4A, 4B.

Moreover, at the user interface 13 each user or operator also has the option of individually configuring the system control 10 or the energy management system of their energy system 1 within a framework specified by the WPK. As FIG. 5 shows for example, parameters relevant to the connection can be set or changed. These parameters are essentially known from the prior art and include in particular MODBUS-type (MODBUS-TCP, MODBUS-RTU), the MODBUS parameters thereof (port, offset, slave addresses, Endian, Baud rate, Parity, Stopbit) as well as further connection parameters (e.g. network or IP addresses such as inverter IP, heat pump IP "HeatpumpIP", smart meter ID).

Furthermore, the control strategy can be configured or selected ("ControlSetPower", "ControlSetTemperature", control by SG-Ready specification or "ControlSetSGStatus" and control by heat pump smart meter simulation or "ControlReadSurplusPower"). In addition, further control parameters can be set, e.g. write intervals "WriteInterval" to establish how often a value is to be sent or network reference limits "ThresholdPurchase" to establish from which power draw from an electricity supply network an action to lower energy consumption is to be taken by the energy management system. Individual inputs of values via the user interface 13 are preferably added to the heat pump configuration file WPK as parameters or values to be used for the initialisation (S0), wherein so-called default values of adapted parameters are retained. If no individual input of a value deviating from a default value is performed via the user interface 13 for a parameter, the corresponding default value is added to the heat pump configuration file WPK as the parameter or value to be used and is used for the initialisation (S0). In a preferred embodiment, the heat pump configuration file WPK is used as a basis for offering a user or operator in the user interface 13 the choice between possible connection and control options, as well as preset meaningful default values as a starting basis.

FIG. 5 shows an example of possible user settings. In the case of the example illustrated in FIG. 5, MODBUS-TCP is set as the MODBUSType. A network or IP address of the heat pump control 8 (Heat Pump IP) is entered. This can be a default value or a user input. In this sense, further IP addresses, e.g. of the one rectifier 3, can be indicated or edited. Possible MODBUS parameters include a port number "TCPPort=502", a MODBUS register address offset value "TCPOffset", a MODBUS slave address "TCPSlaveAddress" and further MODBUS parameters, as illustrated in FIG. 5. The values can originate from the heat pump configuration file WPK. In FIG. 5, the values for the Modbus parameters originate from FIG. 4A. In the case of the example illustrated in FIG. 5, ControlSetPower is selected as the control strategy or control type. 500 watts was entered as the value for the limit for a power draw "ThresholdPurchase" from an electricity supply network 6.

In one possible embodiment, the heat pump configuration file WPK is stored in a unit of the energy system 1. In the case of the example illustrated in FIG. 1, the heat pump configuration file WPK can be stored e.g. in the data memory 11 of the system control 10. Furthermore, it is possible that the heat pump configuration file WPK is also stored in a local memory of the heat pump 7 and is loaded into the data memory 11 of the system control 10 when required. In one possible embodiment, at delivery the heat pump 7 can already have a stored heat pump configuration file WPK in an associated dedicated integrated data memory, which heat pump configuration file is automatically loaded into the data memory 11 of the system control 10 for further operation during or after installation of the heat pump 7 into the energy system 1. In a further possible embodiment, e.g. all available heat pump configuration files WPK can also be stored at the factory in a local data memory of the inverter 3 in order to be loaded into the data memory 11 of the system control 10 when required. In one possible embodiment, the system control 10 can for its part be formed by or integrated into the system control of the inverter 3 of the energy system 1. In a further possible embodiment, heat pump configuration files WPK can be downloaded from a database via a cloud platform to the data memory 11 of the system control 10.

In the case of the energy system 1 in accordance with the invention, associated heat pump configuration files WPK are used for activating the at least one heat pump 7 of the energy system 1 depending upon the control type of the heat pump 7. This can enable signalling from the inverter 3 to the heat pump 7 to cause the heat pump 7 to use inexpensive energy efficiently. In this case, it can be taken into account that different heat pump manufacturers, heat pump types and heat pump models offer different ways of receiving or taking this momentarily favourably available energy from e.g. surplus power from the inverter 3 or a variable electricity tariff.

In one possible embodiment, the energy system 1 in accordance with the invention can integrate heat pumps 7 of a different control type.

A conventional heat pump of control type IV makes it possible to utilise a photovoltaic surplus power, independently of an inverter 3. However, this requires a dedicated heat pump electricity meter or heat pump smart meter provided for the heat pump 7 at the feeding point in order to ensure compatibility between a heat pump control 8 of the heat pump 7 and an electricity meter.

The energy system 1 in accordance with the invention permits the inclusion of a heat pump 7 of the fourth control type IV without having to install an additional heat pump electricity meter, e.g. a heat pump smart meter, in the energy system 1 for this purpose. In the case of the energy system 1 in accordance with the invention, for the fourth control type IV such a heat pump electricity meter or heat pump smart meter for the heat pump control 8 is simulated or emulated by the system control 10 of an inverter 3 via a control interface 12, and so the installation and configuration of an additional heat pump electricity meter can be omitted.

In one possible embodiment, the inverter 3 or the system control 10 as well as the heat pump 7 or the heat pump control 8 of the energy system 1 have a MODBUS interface as the interface or control interface 12. In this embodiment, the energy management system of the inverter 3 determines a current power surplus value at the feeding point and communicates the current or a modified power surplus value to the heat pump 7 of the energy system 1 via the control interface 12. In addition to saving a heat pump electricity meter, this variant offers the advantage that, deviating from the current power surplus value, any power surplus value can be communicated to the heat pump 7. Thus, it is e.g. possible, if there is currently no available power surplus of an energy system 1, to still communicate a power surplus value to the heat pump 7. In this way, the system control 10 of the inverter 3 can cause the heat pump 7 to draw energy from the supply network, in particular when favourably priced energy tariffs are available.

In a possible embodiment of the energy system 1 in accordance with the invention, the control type of the heat pump 7 comprises one type from a specified group of control types. In one possible embodiment, the first control type I is a control type, in which the heat pump 7 is controlled by a set power. In the case of a further second control type II, the heat pump 7 is controlled by a set temperature. In a further possible embodiment, the heat pump 7 can be controlled according to a third control type III by an SG-Ready specification. Furthermore, in one possible embodiment the heat pump 7 can be controlled according to a fourth control type IV by simulation of a heat pump electricity meter. Other control types are possible.

In one possible embodiment, the energy system 1 in accordance with the invention uses a MODBUS communication protocol. The MODBUS communication protocol is based upon a master/slave architecture. In this case, each bus participant has a unique address. Each participant is permitted to send messages via the common communication bus or the interface. Communication is generally initiated by the master and answered by an addressed slave. Possible interfaces include e.g. RS485, RS232, WiFi or Ethernet. Registers are used for writing and reading data values. In the case of the heat pumps 7 which can be controlled via control types I, II, III, the available registers of the respective heat pump control 8 are important. At least the registers of the heat pump control 8 required for the control of a heat pump 7 are stored with their register addresses in the WPK.

With control type IV, the registers of the saved smart meter are simulated by the system control 10 or the inverter 3 for the heat pump control 8.

The heat pump 7 can be a Smart-Grid-Ready-enabled heat pump. The system control 10 can give the Smart-Grid-Ready-enabled heat pump 7 a power or feed power-related switch-on recommendation. As a result, the heat pump control 8 of the heat pump 7 is informed at which times the heat pump 7 is to charge the thermal storage device 9 such that e.g. as much as possible of the photovoltaic current generated by the photovoltaic system 2 is consumed by the energy system 1, thus achieving so-called own-consumption optimisation. In this case, the heat pump 7 can be switched to operation with increased power by an increase in a set-point temperature of the heat pump 7, which results in an increase in energy consumption and an actual temperature of the heat pump 7. The prerequisite for Smart-Grid-Ready activation is that the heat pump 7 is connected to the same feeding or metering point as the inverter 3. This also applies to the remaining stated control types of heat pumps.

A Smart-Grid-Ready-enabled heat pump 7 typically has four activatable SG Ready operating states. In accordance with the prior art, these are controlled via an SG Ready interface. The SG Ready interface of the heat pump control 8 consists of at least two logical inputs (SGPin1, SGPin2), via which one of the four operating states can be specified by a system control 10 of an energy management system. Common "SG Ready" specifications usually describe the following four SG Ready operating states for heat pumps 7:

In a first SG Ready operating state SGMIN, the heat pump 7 is prevented from operating, i.e. the heat pump 7 is in a blocked operating state.

In a second SG Ready operating state SGNORMAL, the heat pump 7 is operated normally. In this operating state, the heat pump 7 runs in an energy-efficient normal operation with proportional heat storage device filling.

In a third SG Ready operating state SGFORCED, the heat pump 7 operates in an amplified mode for hot water preparation and/or room heating. This is not a direct start-up command, but a switch-on recommendation.

In a fourth SG Ready operating state SGMAX, the heat pump control 8 receives a definitive start-up command.

A heat pump control 8 can be activated by the system control 10 or the energy management system for own-consumption optimisation with a predefined electrical power take-up. According to one embodiment in accordance with the invention, a Smart-Grid-Ready-enabled heat pump 7 is activated by an inverter 3 via a control interface 12, preferably a Modbus interface, instead of via the SG Ready interface. For example, one of four SG Ready operating states of the heat pump 7 is specified via the Modbus interface or control interface 12.

The energy system 1 in accordance with the invention illustrated in FIG. 1 includes a system control 10 with communication interface (e.g. Modbus interface) for operating an energy management system, which can be configured via heat pump configuration files WPK as a universal control interface 12 for one or more heat pumps 7 or heat pump controls 8. This offers the advantage that the energy management software for the system control 10 only needs to be developed once, and moreover in a universal implementation in accordance with the invention. The adaptation, i.e. the register writing and/or control strategy, for the respective heat pump 7 can be effected with the aid of the heat pump configuration file WPK. In one possible embodiment, heat pump configuration files WPK can be subsequently provided to the energy management system (e.g. downloaded from a database).

Figure 2:
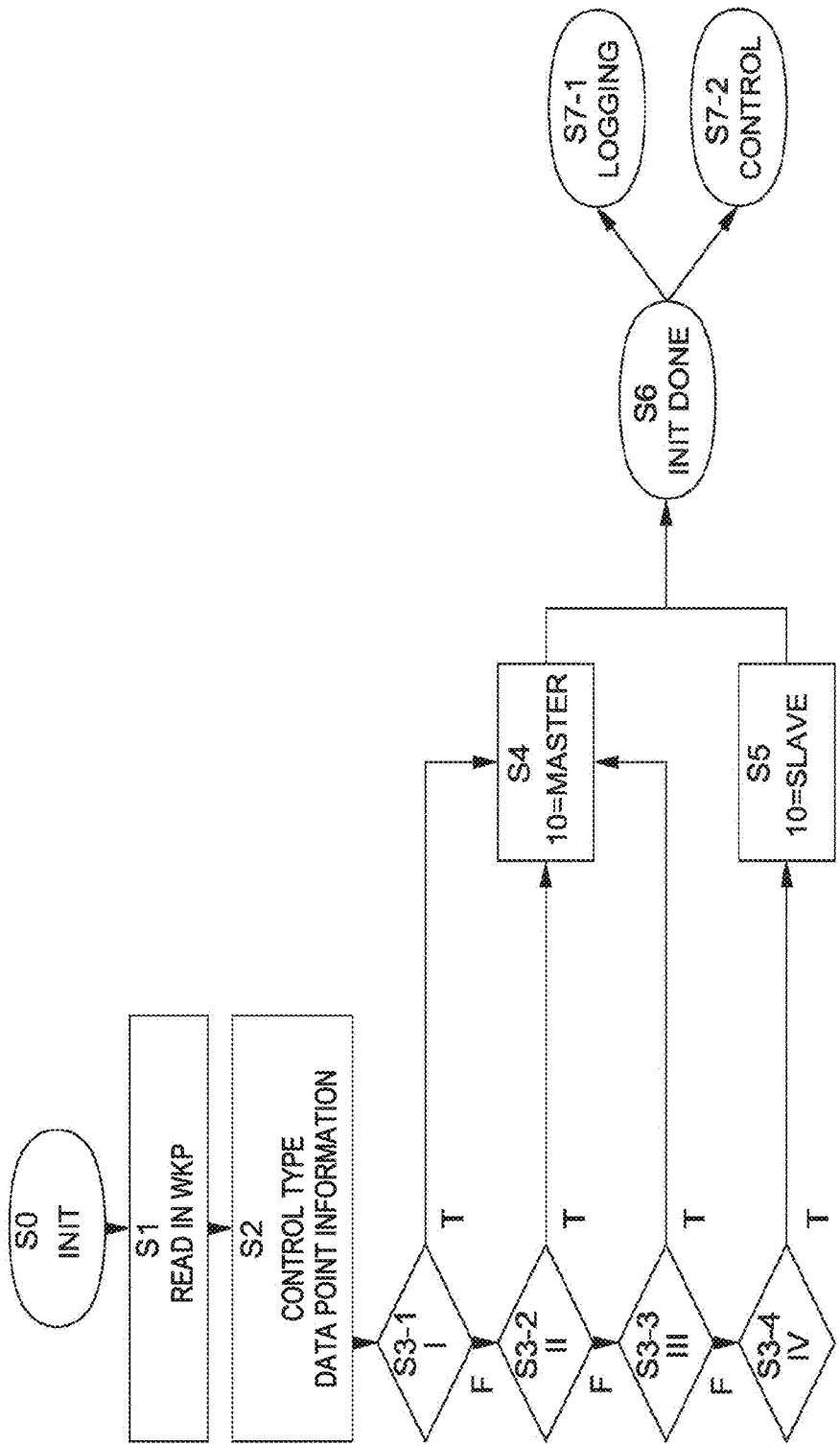
FIG. 2 shows a flow diagram to illustrate an inventive initialisation procedure of the energy management system or system control.

FIG. 2 shows a flow diagram to illustrate an example of an initialisation procedure of a system control 10 or heat pump 7 of an energy system 1 in accordance with the invention. The initialisation procedure (step S0 "INIT") is started when a user confirms the entered parameters and values at the user interface 13. In step S1 "READ-IN WPK", the heat pump configuration file WPK is read out from the data memory 11 by the system control 10. Before the initialisation procedure, the heat pump configuration file WPK can be downloaded e.g. from a web server of a cloud platform to the local data memory 11, or it can have been loaded from a data carrier into the local data memory 11 by a reading unit of the system control 10. The heat pump configuration file WPK indicates data point information in step S2 in dependence upon a selected control type for the relevant heat pump control 8, as illustrated e.g. in FIG. 4B. Then, the system control follows one of the steps S3-1, S3-2, S3-3, S3-4 according to the selected control type (I, II, III, IV). If the heat pump 7 has one of the first three control types (I, II, III), the system control 10 of the energy system 1 is automatically configured as a MODBUS master in step S6. If the heat pump 7 can be controlled by simulating or emulating a heat pump electricity meter (control type IV), the system control 10 is configured as a MODBUS slave in step S5 such that it is recognised as a heat pump electricity meter by a heat pump control 8. The initialisation procedure is completed in step S6 "INIT DONE" with the transfer of all applicable parameters or values from the heat pump configuration file WPK. Following this, with steps S7-1 and S7-4, two further processes can be initiated in parallel.

Figure 3:
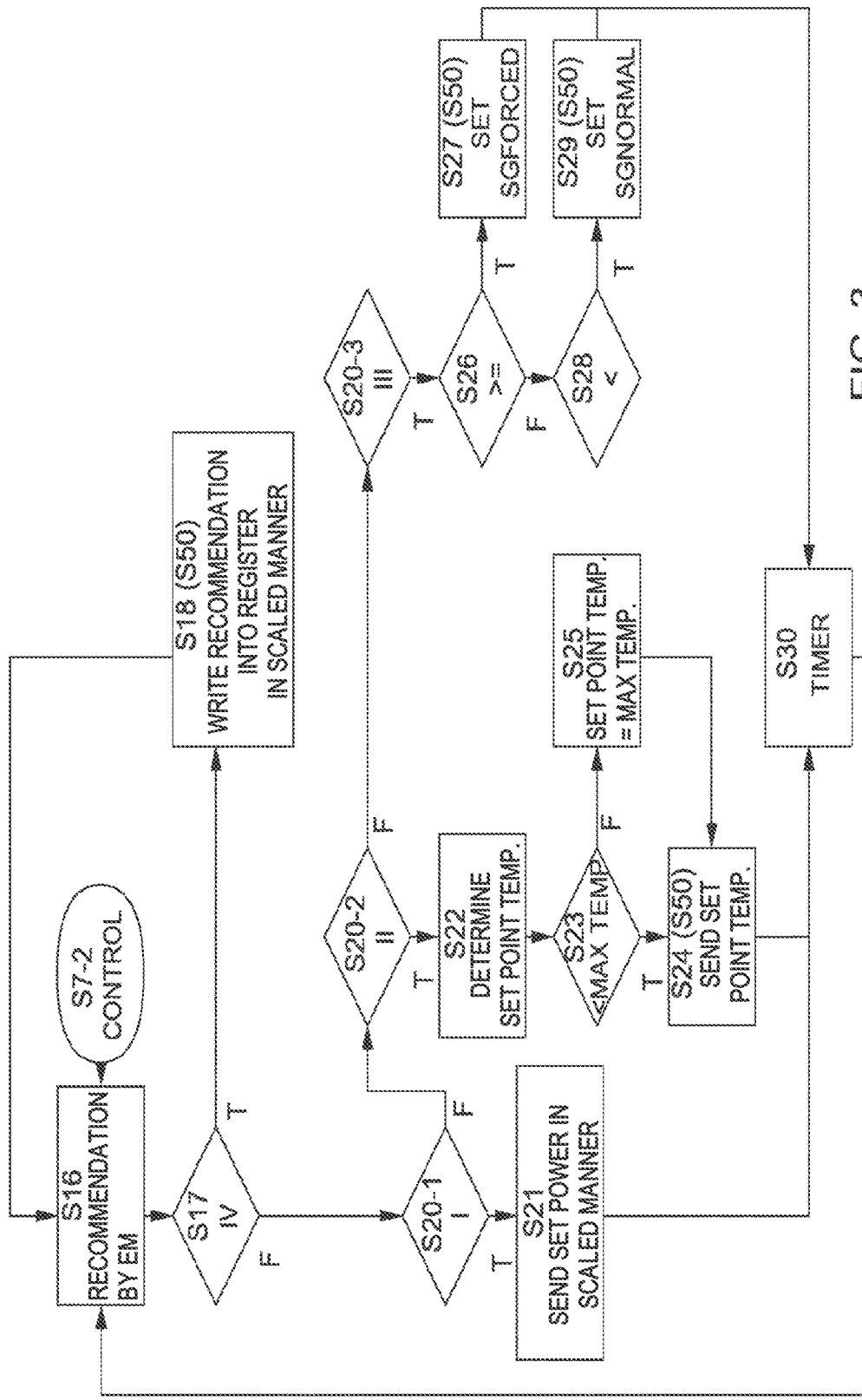
FIG. 3 shows a further flow diagram to illustrate an exemplified embodiment of the method for controlling a heat pump of the energy system.

FIG. 3 shows a flow diagram of an embodiment of one possible main programme for controlling a heat pump 7 (S7-2 "CONTROL") after completion of the initialisation procedure illustrated in FIG. 2.

In a step S16 "RECOMMENDATION FROM EM", a recommendation is from the energy management system EM is provided. In the next step S17, a check is carried out to establish whether control type IV. is present and thus control is effected by simulating a heat pump electricity meter. If this is the case ("T" TRUE), in step S18 the system control 10 scales the recommendation from step S16 according to the heat pump configuration file WPK and provides it to the heat pump control 8 via the register "EnergyMeterE1" of the system control 10. The register address of the EnergyMeterE1 register corresponds to the register address, at which the heat pump control 8 as MODBUS master interrogates a value of a heat pump electricity meter. In FIG. 4B, the register "EnergyMeterE1" is not available. However, in the case of an available control type IV, it would be available and defined. If control type IV is not present, ("F" FALSE), a check is carried out in step S20-1 to establish whether control type I is specified for heat pump 7. If control type I is specified ("T" TRUE), the heat pump 7 is controlled by set power—e.g. by a maximum power of a photovoltaic system—and in step S21 the system control 10 sends or transmits, via the control interface 12, the recommendation from step S16 to the heat pump control 8 of the heat pump 7 in a manner scaled according to the heat pump configuration file WPK. In so doing, the value of the recommendation from the energy management system 10 from step S16 is multiplied by the corresponding scaling factor in order to be written as a set power Psoll in the example of FIG. 4B into the register "SetPowerReg" with the register address "1000". With step S30 "TIMER" a waiting period follows, in which the energy management system observes the energy flow of energy system 1 in order to give a newly determined recommendation in step S16 after expiry of the waiting period.

If step S20-1 provides the result "F" (FALSE) because control type I is not specified, a check is carried out in step S20-2 to establish whether the heat pump 7 is controlled according to control type II. If control type II is specified ("T" TRUE), the heat pump 7 is controlled by set temperature and in step S22 a set-point temperature for the heat pump 7 is determined by the system control 10. The set-point temperature is determined such that it corresponds to a desired power take-up of the heat pump 7. For example, the desired increase of an actual temperature of the heat storage device 9 can be calculated by dividing the set power Psoll by one power jump per Kelvin of a heat pump 7. The sum of actual temperature and desired increase then preferably corresponds to the determined set-point temperature of the heat storage device 9. This must not exceed a maximum temperature of the heat storage device, for which reason a corresponding interrogation is effected in step S23. If the determined set-point temperature is below the maximum temperature "T" (TRUE), the value of the set-point temperature is not changed further. If the determined set-point temperature is above the maximum temperature "F" (FALSE), the value of the set-point temperature in step S25 is set equal to the value of the maximum temperature. In step S24, the set-point temperature is sent or transmitted, via the control interface 12, to the heat pump control 8 of the heat pump 7 in a manner scaled according to the heat pump configuration file WPK. According to the example in FIG. 4B, the set-point temperature would be written as a set temperature to the register "SetTempWS" with the corresponding register address. In the example in FIG. 4B, the register "SetTempWS" is not available "n.a.". However, in the case of an available control type II, it would be available and defined. With step S30 "TIMER" a waiting period follows, in which the energy management system observes the energy flow of energy system 1 in order to give a newly determined recommendation for the set power Psoll in step S16 after expiry of the waiting period.

If step S20-2 provides the result "F" (FALSE) because control type II is not specified, a check is carried out in step S20-3 to establish whether the heat pump 7 is controlled according to control type III. If control type III is specified ("T" TRUE), the heat pump 7 is controlled by SG-Ready specification and a check can be carried out by the system control 10 in step S26 to establish whether the set power is greater than or equal to a specified switch-on threshold. (A corresponding switch-on threshold is indicated in FIG. 5 as "SGThresholdForced" with the value 1000 Watts. However, for the specific example in FIG. 5 this parameter is not relevant. In order to indicate this, "SGThresholdForced" is written in italics). If this is the case, in step S27 the heat pump control 8 of the heat pump 7 is set to the third SG Ready operating state "SGFORCED" by the system control 10 via the control interface 12 in order to activate an increased operation in terms of the third SG Ready operating state. Conversely, if the set power Psoll is lower than the switch-on threshold, this is established in step S28 and in step S29 the heat pump control 8 of the heat pump 7 is set to the second SG Ready operating state SGNORMAL by the system control 10 via the control interface 12 in order to activate a normal operation in terms of the second SG Ready operating state.

In order to set an SG Ready operating state, the system control 10 uses the pattern specified in the heat pump configuration file WPK for an SG Ready operating state, e.g. a pattern of SGPin1 and SGPin2, as illustrated in FIG. 4A. The patterns for the various SG Ready operating states are generally not uniform for heat pumps of different manufacturers.

Steps S27 and S29 are followed by the waiting step S30 already described above.

Figure 6:
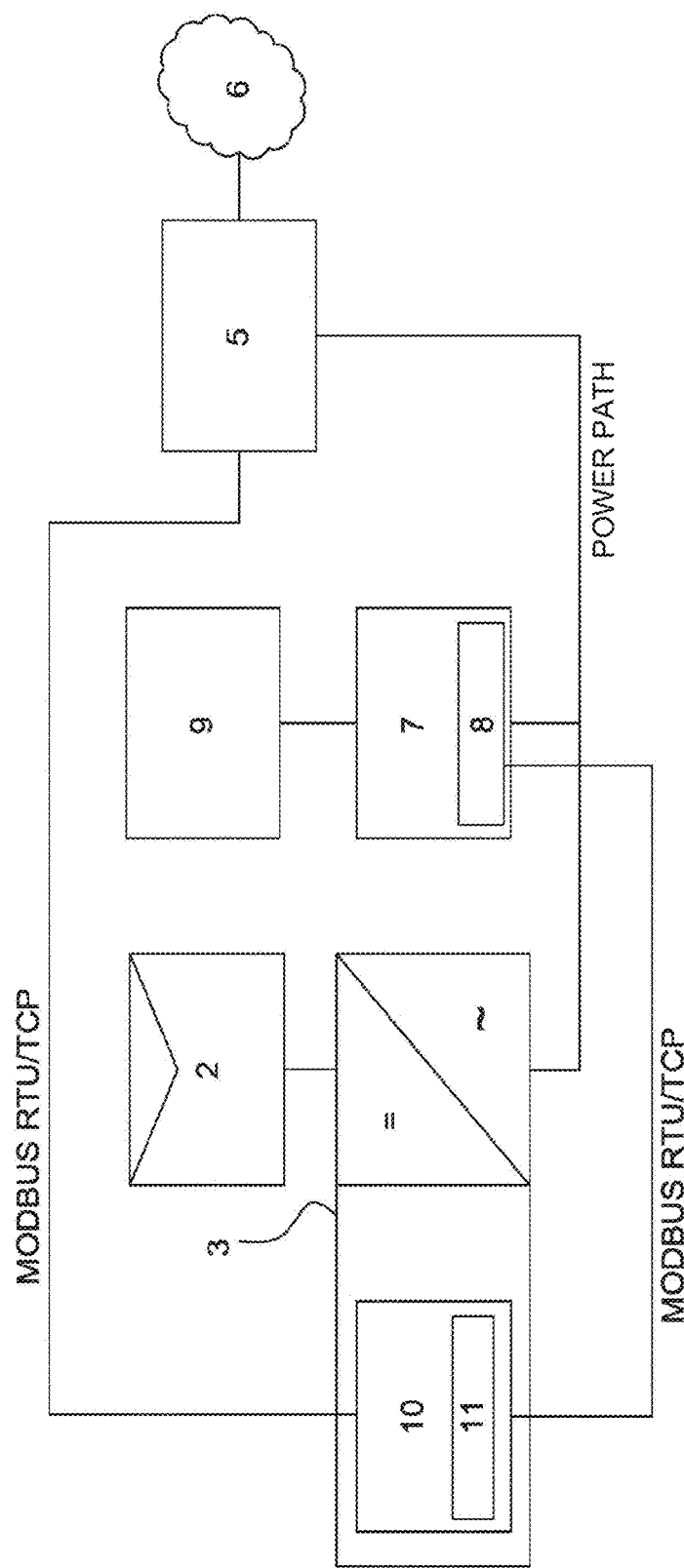
FIG. 6 shows a further block circuit diagram to illustrate an exemplified embodiment of an energy system in accordance with the invention comprising a heat pump of control type IV and a heat pump smart meter simulated for it.

FIG. 6 shows a system control 10 which is integrated in an inverter 3 or which can be the system control 10 of an inverter 3. The same applies to the data memory 11. The remaining units 2, 5, 6, 7, 8, 9 in FIG. 6 correspond to the arrangement illustrated in FIG. 1.

Figure 7:
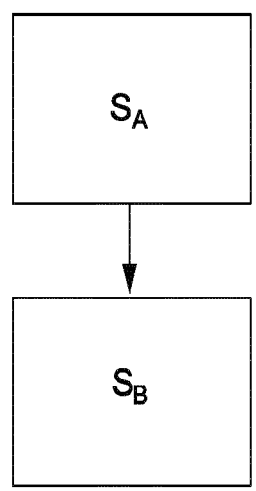
FIG. 7 shows a flow diagram to illustrate an exemplified embodiment of a method in accordance with the invention for controlling a heat pump.

FIG. 7 shows a flow diagram to illustrate an exemplified embodiment of a method in accordance with the invention for controlling a heat pump 7. In the illustrated exemplified embodiment, the method for controlling the heat pump 7 has essentially two main steps.

In a first step $S_A$, a heat pump configuration file WPK is loaded in a data memory 11 of a system control 10 of an energy management system 1. Then, in step $S_B$, a communication of the system control 10 of the energy system 1 with a heat pump control 8 provided for the heat pump 7 is effected according to a control type indicated in the heat pump configuration file WPK. As a result, the heat pump 7 is incorporated into an energy management system of the energy system 1. The communication SB between the heat pump control 8 and the system control 10 is effected preferably bidirectionally. The communication is effected via the control interface 12, as illustrated in FIG. 1. The heat pump control 8 can be integrated in the heat pump 7 or connected locally to the heat pump 7 via an interface. The heat pump control 8 controls the heat pump 7 locally and thereby communicates preferably in the background with the system control 10 via the control interface 12. The loaded heat pump configuration file WPK preferably indicates at least one communication protocol for communication of the system control 10 with the heat pump control 8. Accordingly, the bidirectional communication between the system control 10 and the heat pump control 8 of the heat pump 7 is effected via the control interface 12 according to the communication protocol which [lacuna] by the associated heat pump configuration file WPK, which has been created for the heat pump 7, and which has been loaded in the data memory 11 of the system control 10. In one possible embodiment, the indicated communication protocol has a MODBUS communication protocol, in particular a MODBUS-TCP communication protocol or a MODBUS-RTU communication protocol. In one possible embodiment, the control of the associated heat pump 7 by the heat pump control 8 effected during the communication in step SB can be effected such that own-consumption is optimised or efficiency with respect to own-consumption or energy consumption is increased. In one possible embodiment, an individual configuration can be performed via a user interface within a framework or format specified by the heat pump configuration file WPK. For example, values can be edited and parameterised.

With the inventive energy management system or system control 10 of an energy system 1, the control or regulation of the heat pump 7 can be effected for different heat pump types which are activated differently. Heat pumps 7 of a different type can thus be easily incorporated into the energy system 1 in accordance with the invention. Furthermore, it is possible to easily replace an existing heat pump 7 with another heat pump of a different control type.

The invention claimed is:

1. An energy system comprising:
   at least one electrical consumption unit and at least one heat pump which has a heat pump control, wherein the heat pump is configured to support one or a plurality of control types from a specified group of control types, wherein the specified group of control types includes;
   a first control type, in which the heat pump can be controlled by set power,
   a second control type, in which the heat pump can be controlled by set temperature,
   a third control type, in which the heat pump can be controlled by a Smart Grid Ready (SG-Ready) specification, and
   a fourth control type, in which the heat pump can be controlled by simulation of a heat pump electricity meter;
   an inverter for converting an electrical direct voltage into an alternating voltage which can be used to supply the at least one electrical consumption unit and can be converted into heat by the at least one heat pump,
   a system control having a data memory, into which a heat pump configuration file, which can be configured for various types of heat pumps, is stored, wherein the heat pump configuration file indicates at least one control type of the specified group of control types supported by the heat pump and includes configurable operating parameters for parameterizing the at least one control type and/or the at least one heat pump;
   wherein the at least one heat pump can be controlled by the system control via a control interface in accordance with the heat pump configuration file, and
   wherein a communication of the system control with the heat pump control is effected in accordance with one of the at least one control type of the heat pump indicated in the heat pump configuration file.

2. The energy system as claimed in claim 1, wherein:
   at least one communication protocol for communication of the system control with the heat pump control is indicated in the heat pump configuration file, and
   the communication protocol indicated in the heat pump configuration file has a MODBUS communication protocol.

3. The energy system as claimed in claim 2, wherein the system control is configured to communicate bidirectionally with the heat pump control via the control interface or a bus of the energy system in accordance with a communication protocol indicated in the heat pump configuration file.

4. The energy system as claimed in claim 3, wherein:
   the heat pump configuration file includes a network or IP address of the heat pump control for communicating with the system control of the energy system in accordance with the data point information indicated in the heat pump configuration file of the heat pump, and
   the heat pump configuration file of the heat pump includes a JSON, XML, CSV or TXT file.

5. The energy system as claimed in claim 2, wherein the system control is automatically configured as a master device or as a slave device in dependence upon the control type indicated in the heat pump configuration file.

6. The energy system of claim 2, wherein the MODBUS communication protocol is one of a MODBUS-TCP communication protocol and a MODBUS-RTU communication protocol.

7. The energy system as claimed in claim 1, wherein:
   the system control is integrated in the inverter of the energy system, or
   the system control is formed by means of a control of the inverter to form an energy management system.

8. The energy system as claimed in claim 7, wherein the control interface is formed by a MODBUS interface of the inverter and of the heat pump.

9. The energy system as claimed in claim 1, wherein the energy system is connected to an electricity supply network via an electricity measuring unit which is configured to provide measurement data to the system control or to an energy management system of the energy system.

10. The energy system as claimed in claim 1, wherein the heat pump configuration file can be selected and extended via a user interface of the system control or of an energy management system of the energy system.

11. The energy system as claimed in claim 1, wherein the heat pump configuration file is loaded by one of:
    from a web server of a cloud platform via a data network into the local data memory of the system control of the energy system, and
    a reading unit of the system control from a data carrier into the local data memory of the system control of the energy system.

12. A method for controlling a heat pump comprising the steps of:
    loading a heat pump configuration file which can be configured for various types of heat pumps into a data memory of a system control of an energy system, wherein the heat pump configuration file indicates at least one control type from one or a plurality of control types from a specified group of control types supported by the heat pump and includes configurable operating parameters for parameterizing the at least one control type and/or the heat pump; and
    communicating by the system control of the energy system with a heat pump control provided for the heat pump in accordance with one of the at least one control type indicated in the heat pump configuration file, whereby the heat pump is incorporated into an energy management system of the energy system, and wherein the specified group of control types includes;
    a first control type, in which the heat pump is controlled by set power,
    a second control type, in which the heat pump is controlled by set temperature,
    a third control type, in which the heat pump is controlled by a Smart Grid Ready (SG-Ready) specification, and
    a fourth control type, in which the heat pump is controlled by simulation or emulation of a heat pump electricity meter.

13. The method as claimed in claim 12, wherein:
    at least one communication protocol for communication of the system control with the heat pump control is indicated in the loaded heat pump configuration file, and the communication between the system control and the heat pump control is effected in accordance with the indicated communication protocol, and
    the communication protocol has a MODBUS communication protocol.

14. The method of claim 13, wherein the MODBUS communication protocol is one of a MODBUS-TCP communication protocol and a MODBUS-RTU communication protocol.

15. A system control for an energy system having at least one heat pump, wherein the heat pump is configured to support one or a plurality of control types from a specified group of control types, wherein the specified group of control types comprises:
- a first control type, in which the heat pump can be controlled by set power,
- a second control type), in which the heat pump can be controlled by set temperature,
- a third control type, in which the heat pump can be controlled by a Smart Grid Ready (SG-Ready) specification, and
- a fourth control type, in which the heat pump can be controlled by simulation or emulation of a heat pump electricity meter, wherein the system control includes;
- a data memory, in which a heat pump configuration file for a heat pump is loaded, wherein the heat pump configuration file which can be configured for various types of heat pumps, indicates at least one control type of the specified group of control types supported by the heat pump and includes configurable operating parameters for parameterizing the at least one control type and/or the heat pump; and
- a control interface, via which the system control communicates with a heat pump control provided for the heat pump in accordance with one of the at least one control type, indicated in the loaded heat pump configuration file, for incorporating the heat pump into the energy management system.

* * * * *